United States Patent [19]
Begur et al.

[11] Patent Number: 5,301,328
[45] Date of Patent: Apr. 5, 1994

[54] SYSTEM AND METHOD FOR SHADOWING AND RE-MAPPING RESERVED MEMORY IN A MICROCOMPUTER

[75] Inventors: Sridhar Begur; Irvin R. Jones, Jr., both of San Jose, Calif.

[73] Assignee: Hewlett-Packard Company, Palo Alto, Calif.

[21] Appl. No.: 951,650

[22] Filed: Sep. 25, 1992

Related U.S. Application Data

[62] Division of Ser. No. 472,057, Jan. 31, 1990, Pat. No. 5,202,994.

[51] Int. Cl.$^5$ .............................................. G06F 12/02
[52] U.S. Cl. ....................................... 395/700; 395/400; 364/DIG. 1; 364/280; 364/280.9; 364/281.1
[58] Field of Search ................................ 395/700, 400

[56] References Cited

U.S. PATENT DOCUMENTS

| | | | |
|---|---|---|---|
| 4,459,658 | 7/1984 | Gabbe et al. | 364/200 |
| 4,475,176 | 10/1984 | Ishii | 364/900 |
| 4,564,922 | 1/1986 | Muller | 364/900 |
| 4,713,756 | 12/1987 | Mackiewicz et al. | 364/200 |
| 5,237,669 | 8/1993 | Spear | 395/400 |

Primary Examiner—Gareth D. Shaw
Assistant Examiner—Kakali Chaki

[57] ABSTRACT

A system and method for managing the reserved memory in a microcomputer copies selected portions of reserved memory to a new reserved memory having a faster access time, and allows any free portions of the new reserved memory to be accessed by a typical software application. After the selected portions of reserved memory are copied, all access to an address within a selected portion are re-directed to the new reserved memory. Any free portions of new reserved memory have additional, accessible memory re-mapped to these free portions.

7 Claims, 6 Drawing Sheets

SYSTEM AND METHOD FOR SHADOWING AND RE-MAPPING RESERVED MEMORY IN A MICROCOMPUTER

CROSS REFERENCE TO RELATED APPLICATION(S)

This is a divisional of copending application Ser. No. 07/472,057 filed on Jan. 31, 1990, now U.S. Pat. No. 5,202,994.

BACKGROUND OF THE INVENTION

1. Field Of The Invention

The present invention is a system and method for efficiently managing the reserved memory of a microcomputer.

2. Related Art

Within the internal memory of a microcomputer, certain addresses of memory are set aside to perform special system functions, and are thus not available for typical software applications to use. In the case of microcomputers, this memory, known generally as reserved memory (and referred to as original reserved memory herein), typically includes portions which can comprise video memory, the basic input/output system (BIOS) whose contents are accessed during and after the initialization of the microcomputer, and memory set aside for use by peripheral devices. Some of these portions of original reserved memory are read-only, such as the BIOS and video ROM (read-only memory), whereas some can be read/write such as the video RAM (random access memory).

In most microcomputers, the BIOS and video ROM are stored on an EPROM (erasable programmable read-only memory). This type of memory device is slower than other read/write memory devices, such as dynamic random access memory (DRAM). Since the video ROM and BIOS are typically utilized very frequently, these ROMs are often copied to a memory device (referred to herein as new system memory) having faster access time.

In view of the desirability of copying the slower, original reserved memory to a new, faster memory, a technique known as "shadowing" was devised. This technique allows for the copying of select portions of the original reserved memory to a new system memory, and then subsequently accessing the copied portions residing on the new system memory in lieu of accessing the selected portions of the original reserved memory. In a typical shadowing scheme, the selected portions of the original reserved memory and the corresponding portions of the new system memory (to which the selected portions of the original reserved memory are copied) are at the same memory address locations. (The new system memory having address locations corresponding to the original system memory is referred to herein as shadow memory.)

To avoid corruption of data, it is important that both the selected portions of the original reserved memory being copied and corresponding portions of shadow memory are not enabled at the same time. Thus, once the selected portions of original reserved memory are copied to the shadow memory, access to the selected portions of original reserved memory are directed to the corresponding portions of the shadow memory. Reading from the shadow memory allows for quicker and more efficient access of the BIOS and any other portions of the original reserved memory that have been selected to be shadowed.

Conventionally, shadowing is performed by copying the contents of the selected portions of the original reserved memory to be shadowed to some temporary memory location. Once these selected portions are transferred into these temporary memory locations, the selected portions of the original reserved memory are disabled, and the corresponding portions of shadow memory are enabled. Then, in a second step, the contents of these temporary locations are copied into the shadow memory at the same memory address locations from which they originally came. Thereafter, access to the selected portions of the original reserved memory results in the access of corresponding portions of the shadow memory.

The problem with the conventional approach of shadowing is that it requires a two step process, in that the selected portions of the original reserved memory require a first step of being written to a temporary memory location, and then require a second step of being written to the corresponding portions in the shadow memory. In addition, the conventional approach also utilized a scheme in which a first indicator is used to determine whether the original reserved memory or the shadow memory is to be accessed, and a second indicator to determine if write-access to the shadow memory is to be permitted. The purpose of the second indicator is to prevent the shadow memory to be inadvertently written to once the contents of original reserved memory had been copied to the shadow memory. Without this second indicator, corruption of the shadow memory could otherwise result.

A problem with the above two-indicator approach is that it wastes states. For example, there would be no purpose in activating the second indicator unless the first indicator indicated that the shadow memory was to be accessed.

The conventional approach of memory management of reserved memory has another significant deficiency and problem as follows. After the selected portions of the reserved memory have been copied into the shadow memory, it is often the case that much of the shadow memory is free memory that is not utilized. That is, it is usually the case that at least some of the portions of the original reserved memory are not shadowed, and the corresponding portions in the shadow memory remain unused. Since typical software applications are not designed to be able to access reserved memory for general storage purposes, these free portions of shadow memory are wasted, unless some mechanism/approach is devised to allow access to these free portions. By "typical software application", it is simply meant a software application that is not specifically designed to write to addresses within the original reserved memory.

Conventional methods exist for accessing the free portions of shadow memory, but they are all deficient in certain respects. In one conventional method, special expanded memory drivers are used to logically re-map accessible memory locations to the free memory. However, these expanded memory drivers are utilized during run-time of the software applications rather than during initialization of the microcomputer, and tend to degrade system performance.

Another conventional scheme is to re-map the highest address that the microcomputer is capable of addressing to portions of shadow memory. The disadvantage of this conventional method is that the memory location from which the free memory is re-mapped sometimes does not border on existing memory locations, and thus the total available memory is not contiguous. That is, there is a gap between the top location of system memory and the bottom location of the additional memory made available by the re-mapping.

Further, all conventional re-mapping schemes only allow free reserved memory to be re-mapped from below the address corresponding to 16 megabytes. Thus, if there is more than 16 megabytes of new system memory, the free reserved memory cannot be re-mapped to.

Moreover, conventional re-mapping schemes do not permit typical software applications to access this free reserved memory. The conventional re-mapping schemes only allow the free reserved memory to be accessed for special purposes, such as for disk cache memory. Thus, computer programs need to be customized to take advantage of this free memory in conventional microcomputer systems and methods.

SUMMARY OF THE INVENTION

The present invention overcomes the deficiencies of the related art noted above by providing a system and method for managing the reserved memory of a microcomputer so that portions of the reserved memory which are frequently accessed can be accessed quickly, and for permitting reserved memory which is not utilized to be used as free memory accessible by typical software applications. More specifically, the present invention relates to a system and method for shadowing selected portions of original reserved memory (as defined above) using a shadow memory on a new system memory in a microcomputer, and for re-mapping additional system memory whose memory locations begin immediately above the highest distinct physical address of the new system memory, to unused portions (free reserved memory portions) of the shadow memory.

In general, the present invention first determines which portions of the original reserved memory have been selected to be shadowed. It then copies the contents of the selected portion of the original reserved memory to a corresponding portion of shadow memory. The selection decision can be made based on any number of factors, including the whim of a user.

Since the original reserved memory and the shadow memory contain identical memory address locations, it is important that only one of these memories be accessible at any one time. The present invention uses a single indicator for each portion of original reserved memory in controlling the shadowing process.

During the copying of a selected portion of original reserved memory to a corresponding portion of shadow memory, the indicator indicates that a first state is active. This causes the original reserved memory to be read from, and the shadow memory to be written to without the indicator being changed. Thus, the copying process consists of data being read from a memory address, and then written back to the same address, with the net effect being that the contents of the memory address being read from the original reserved memory are copied into the shadow memory.

After this copying has been completed, the indicator will indicate that a second state is active. In this second state, when a read is attempted, the shadow memory is read from. If a write is attempted, nothing will happen. This effectively write-protects the shadow memory.

The present invention also allows otherwise inaccessible free reserved memory to be utilized, by re-mapping accessible memory addresses to the free reserved memory. Based upon which portions of original reserved memory have been selected to be shadowed, the present invention first re-arranges the portions of shadow memory so that non-contiguous portions of free reserved memory become contiguous. It then and determines the total size of these free portions. The highest location of actual, physical new system memory is detected, and additional system memory addresses are allocated immediately above this highest location. The size of this additional system memory will correspond to the size of the free reserved memory portions.

Once the additional system memory has been re-mapped, then any read or write access to the additional system memory will be re-directed to corresponding portions of the free reserved memory. In this way, typical software applications can take advantage of free, unused portions of shadow memory. It should be emphasized, however, that this additional system memory does not physically exist, but is only used as a platform for re-directing read/write accesses to unused portions of shadow memory.

BRIEF DESCRIPTION OF THE DRAWINGS

Various objects, features, and attendant advantages of the present invention can be more fully appreciated as the same become better understood with reference to the following detailed description of the present invention when considered in connection with the accompanying drawings, in which.

DETAILED DESCRIPTION OF THE PREFERRED EMBODIMENTS

The present invention is a system and method for efficiently managing the reserved memory of a microcomputer. More specifically, the present invention relates to a system and method for copying at least one selected portion of reserved memory (referred to herein as original reserved memory) in a microcomputer to a corresponding portion of a faster shadow memory for subsequent use, and for the efficient utilization of unused and otherwise unaccessible reserved memory by re-mapping an accessible memory location to this unused memory to. In a preferred embodiment, the copying of the selected portions of original reserved memory are accomplished first, and then the re-mapping occurs. Also in a preferred embodiment, both the copying and the re-mapping occur during the initialization of the microcomputer.

Figure 1:
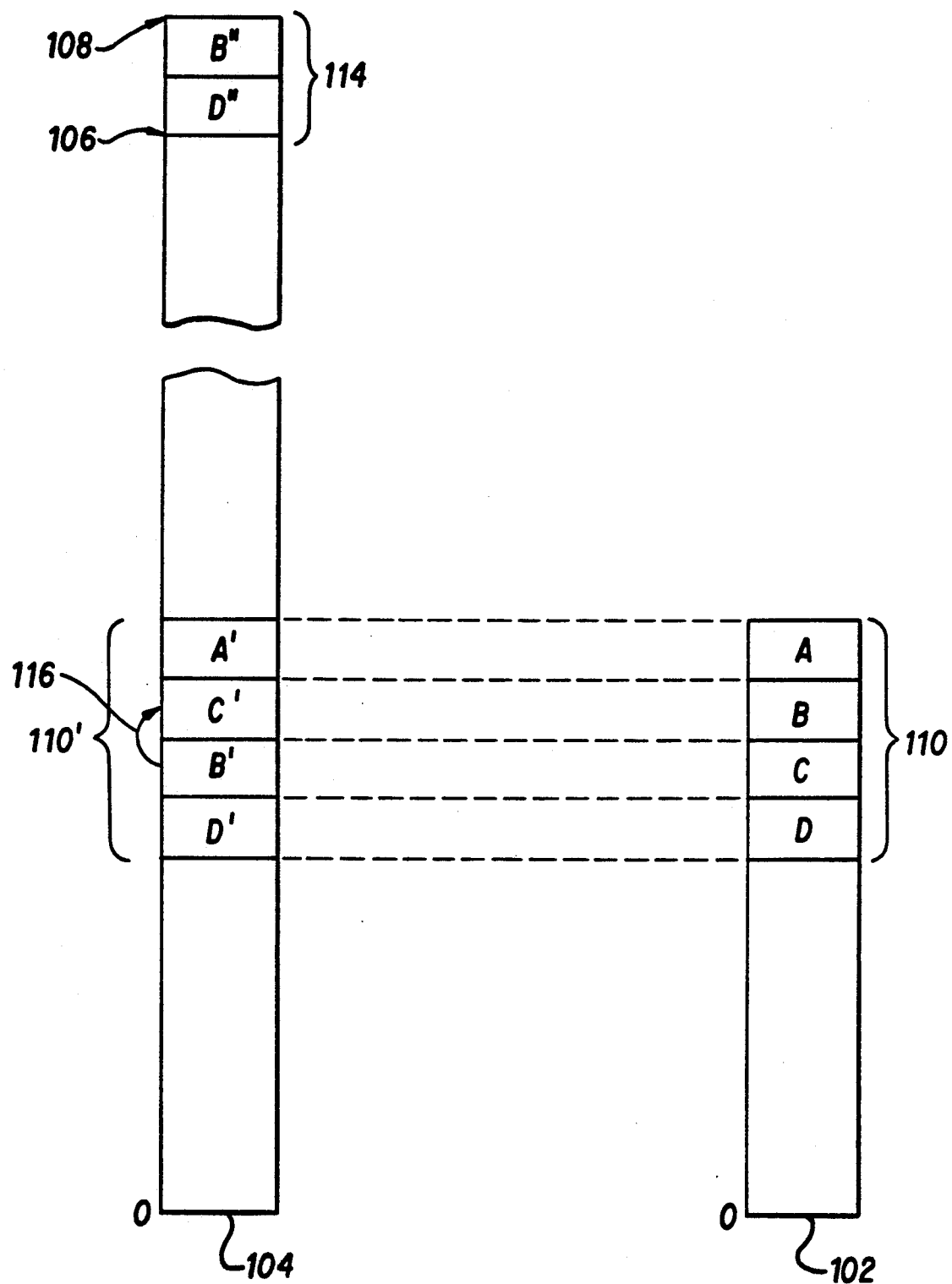
FIG. 1 is a high-level conceptual diagram of the present invention.
Figure 2:
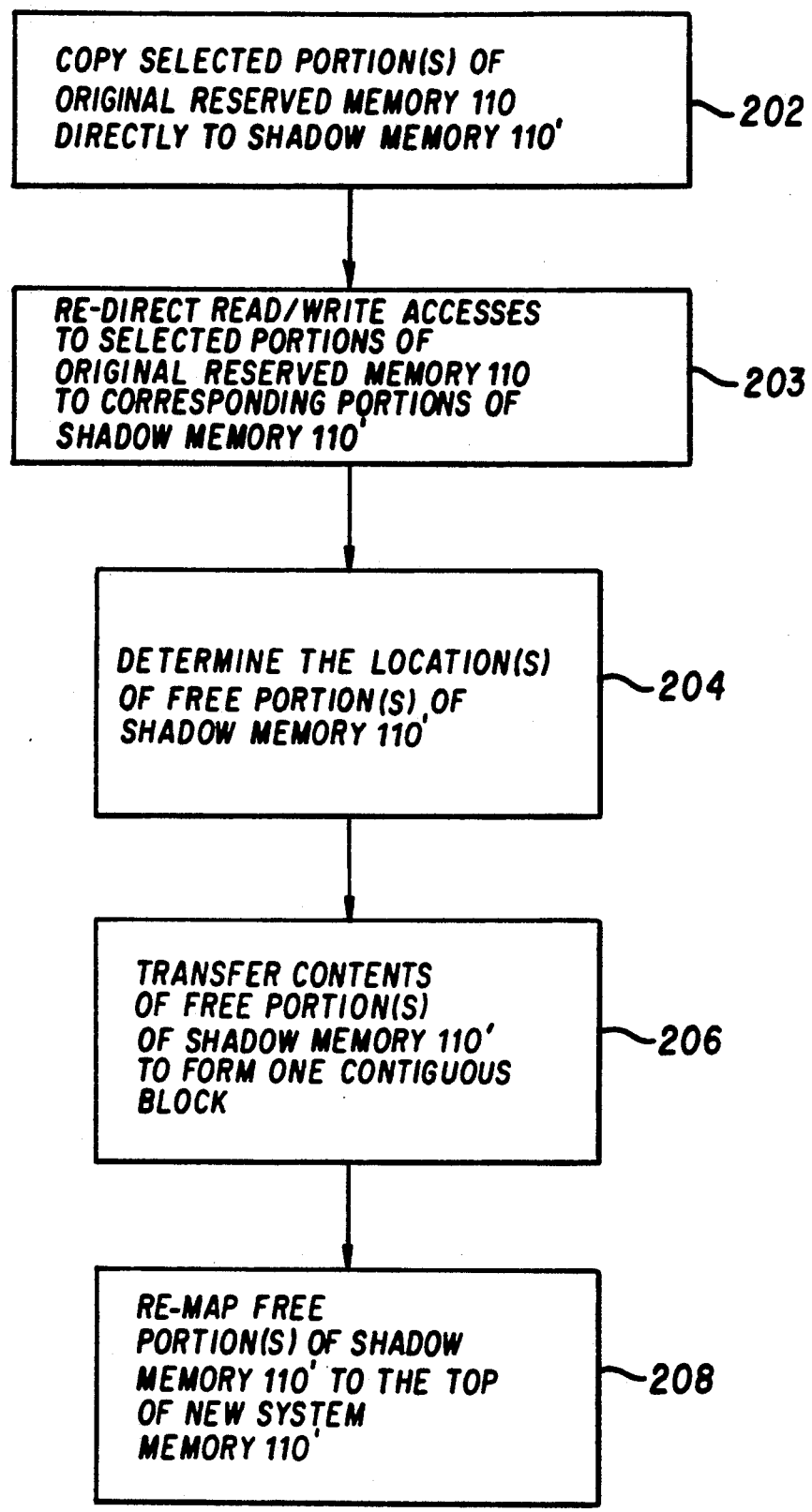
FIG. 2 is a high-level flow diagram of the present invention.

A broad overview of the present invention is shown in FIGS. 1 and 2. Referring first to FIG. 1, an original reserved memory 110 which is part of an original system memory 102, is shown. The original reserved memory 110 comprises address locations which are grouped together for purposes of discussion into portions A–D. In one embodiment, these portions represent arbitrary subdivisions (that is, of no particular size) into which system subroutines or reserved storage locations can reside.

Also shown in FIG. 1 is a new system memory 104 having within it certain memory locations corresponding to the address locations of the original reserved memory 110. These corresponding memory locations are referred to collectively as a shadow memory, which are indicated by 110'. The address locations encompassed by original reserved memory 110 and the shadow memory 110' are not accessible by typical software applications for general storage purposes.

Referring now to FIG. 2, shown diagrammatically are the broad steps for the memory management operation of the present invention. A block 202 describes the first step in the memory management operation, which states that selected portions of original reserved memory 110 are to be copied "directly" from the original reserved memory 102 to the corresponding portions of the new system memory 104. By directly, it is meant that the selected portions of original reserved memory 110 are transferred incrementally by a processing unit such as a central processing unit (CPU) of the microcomputer (not shown) to corresponding portions of shadow memory 110' without the use of any intermediate memory locations. For example, if the portion of reserved memory 110 designated as A (FIG. 1) is selected, the contents of this selected portion are copied to the corresponding portion of the shadow memory designated as A'. No intermediate memory area is needed for this copying.

A block 203 shows the next step of causing any accesses to the selected portions of the original reserved memory 110 to be re-directed to the corresponding portions of the shadow memory 110'. With regard to the above example, any subsequent read or write accesses to a memory location within the portion designated A are redirected to the corresponding location at A'.

It should be noted that some of the above-mentioned description relating to shadowing implies that more than one portion of original reserved memory 110 is selected to be shadowed. However, it should be understood that this is only by way of example, and that the present invention also contemplates selecting only a single portion of original reserved memory 110 to be shadowed.

After the shadowing is accomplished, the next step in the memory management operation is described in a block 204. This block 204 indicates that a determination must be made as to which portions of shadow memory 110' are unused, and thus free. This unused memory (generally referred to as free reserved memory herein) results from not selecting portions of original reserved memory 110 to be shadowed. For example, if the portion of reserved memory designated D (FIG. 1) has not been selected to be shadowed, then the corresponding portion of shadow memory designated D' will remain unused.

Once it has been determined which portions of shadow memory 110' are free, then the next step is that shown by a block 206. Referring to block 206, contents of those portions of shadow memory 110' which are utilized (that is, which store the contents of a selected portion of original reserved memory 110) are copied to portions of shadow memory 110' contiguous with other utilized portions of shadow memory 110'. In this way, utilized portions of shadow memory 110' are contiguous, as are the portions of free reserved memory.

An example of the above is shown by FIG. 1, which shows that portions A' and C' of the shadow memory 110' are utilized by the system, and blocks B and D are not. As shown diagrammatically by an arrow 116, the contents of portion C' are then transferred to portion B', and thus in effect the two portions B' and C' are switched. In this way, utilized portions A' and C' are contiguous in shadow memory 110', as are portions B' and D' which contain the free reserved memory.

Referring again to FIG. 2, a final step in the memory management operation is shown by a block 208, in which free reserved memory portions are re-mapped from a highest distinct physical address of new system memory 106. FIG. 1 shows the example where free reserved memory portions B' and D' are re-mapped from the memory locations of new user memory designated by portions B'' and D'', creating the appearance of an additional system memory 114. Thus, the additional system memory 114 begins at the memory location shown by the highest distinct physical address of new system memory 106 and ends at the address at the top of the re-mapped portion 108.

Once re-mapping has occurred in the present invention, memory portions C' and D' appear to have been physically moved to the memory locations beginning at the highest distinct physical address of new system memory 106. Thus, the memory addresses corresponding to the additional system memory 114 appear to the software application (not shown) to be usable, accessible memory locations. In this way, the additional system memory 114 has been re-mapped to the free reserved memory within shadow memory 110'. This re-mapping then allows a typical software application to utilize free reserved memory that would otherwise not be accessible. It should be emphasized, however, that no additional physical memory is actually associated with additional system memory 114. It only appears that way to a typical software application.

Figure 3:
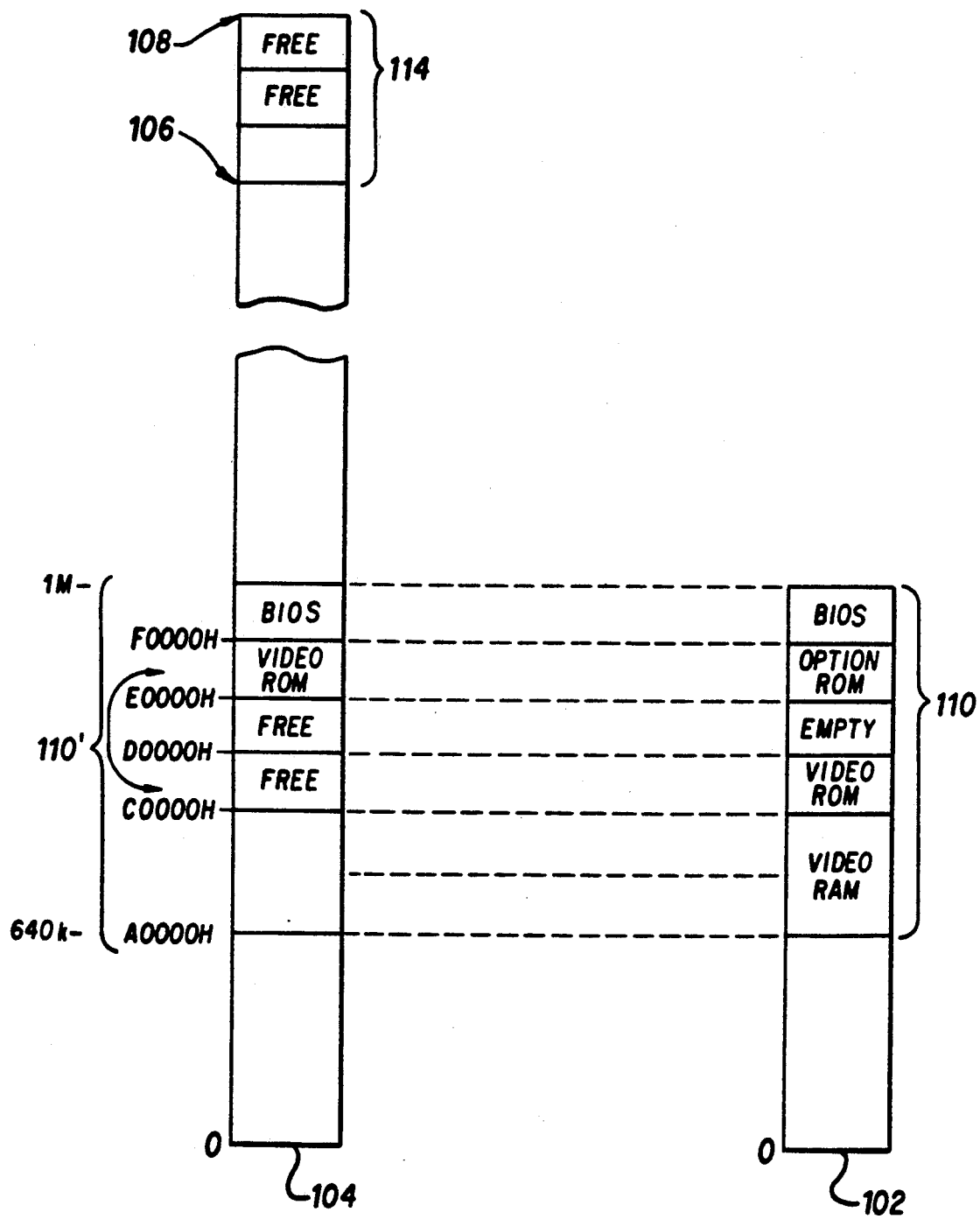
FIG. 3 is a medium-level conceptual diagram of the present invention.
Figure 4:
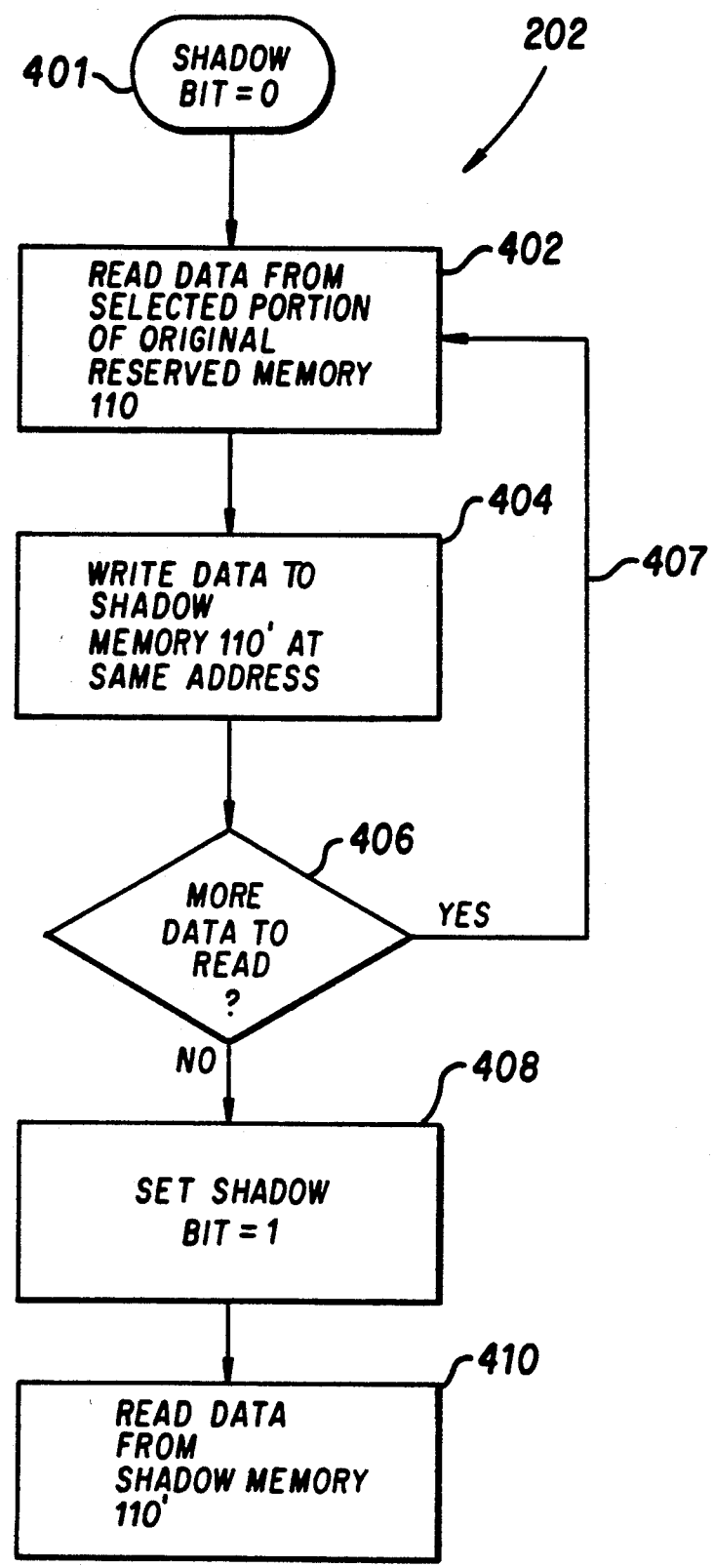
FIG. 4 is a medium-level flow diagram of the shadowing mechanism of the present invention.

A somewhat more specific example of the implementation of a preferred embodiment of the present invention is now described, with reference to FIGS. 3 and 4. FIG. 3 shows a preferred embodiment of the anticipated contents of original reserved memory 110. These contents include a BIOS, option ROM, video ROM and video RAM. It should be understood that the contents of original reserved memory 110 as shown in FIG. 3 only relate to a preferred embodiment, and that other items (such as memory files) can also be part of original reserved memory 110.

FIG. 4 shows diagrammatically a preferred embodiment for shadowing selected portions of original reserved memory 110 during initialization of the microcomputer (not shown).

In a preferred embodiment, the original reserved memory 110 is partitioned into portions of equal length. Each of these portions has associated with it a bit, called a shadow bit, preferably stored in a register (not shown). Each shadow bit controls the shadowing for each of the portions of the original system memory 110 when selected, as described below.

During initialization of the microcomputer, the shadow bits are reset to 0 (as shown by oval 401), and an address pointer (not shown) is set to the first memory location of a selected portion of original reserved memory 110. Then, beginning with a block 402, a double word of data from a selected portion of original reserved memory 110 is read by the CPU (not shown).

After the CPU has read the double word of data, the CPU is then instructed to write the double word of data back to the same address that it had originally read the double word of data from, as shown by a block 404. When the CPU writes the double word of data, however, the present invention actually causes the double word of data to be written directly to a corresponding portion of the shadow memory 110'. It should be noted that since the original reserved memory 110 and the new reserved memory 110' have identical memory addresses, only one of these memories can be enabled and accessed at any one time. Thus, the present invention controls which of the two reserved memories (either the original reserved memory 110 or new reserved memory 110') to read from and write to. It should be understood that a CPU as used above is used only by way of example, and that other types of processing units could also be used.

Once a double word of data is written into shadow memory 110', the present invention then determines if there are any more words of data to be read from the selected portion of the reserved memory 110, as is shown by a decision box 406. If there is more memory to read, then the next double word of data is read from the selected portion of the original reserved memory 110, and the cycle continues until the entire selected portion of original reserved memory 110 is copied, as is shown by the loop made up of an arrow 407, block 402, block 404, and decision block 406. If there is no more memory to read, then the shadow bit is set to 1, as indicated by a block 408. When this occurs, all read accesses to memory locations within a selected portion of reserved memory 110 are directed to the memory location within the corresponding portion of the shadow memory 110', as indicated by a block 410. Thus, the shadow bit is used as an indication as to which of the system memories (original system memory 102 or new system memory 104) is enabled. Of course, it should be understood that the shadow bit is merely an indication of the mode of operation of the present invention (which is explained in more detail below), and that any means for indicating such modes could also be used. It should also be understood that while the reading and writing of a double word of data was performed by the CPU, that any unit of data which the CPU (or any other processing unit such as a direct memory access controller) can load and store could also be used.

As shown in FIG. 3, in a preferred embodiment, the original reserved memory 110 and shadow memory 110' both reside at system memory locations having addresses in the range between, for example, A0000H (H meaning hexidecimal) and FFFFFH (this address range generally referred to herein as the reserved memory range). These addresses are used in a preferred embodiment since they correspond to industry standards for IBM PCs and compatibles. However, it should be understood that original reserved memory 110 and shadow memory 110' could also be at a different address, and be of different sizes.

As stated above, there may be portions of shadow memory 110' which are not being utilized, and thus could be used by typical software applications for general storage purposes should they be able to access these free reserved memory portions. Since typical software applications are generally not designed to address reserved memory 110' for general storage purposes, re-mapping of the addresses must be accomplished to make this free reserved memory accessible.

Referring again to FIG. 3, in a common situation contemplated by a preferred embodiment of the present invention, only the BIOS and video ROM are selected to be shadowed. Thus, all other portions of shadow memory 110' corresponding to non-selected portions of original reserved memory 110 are not utilized, and thus contain free reserved memory. To make this free reserved memory accessible, the first step that the present invention takes is to cause the utilized and free portions of shadow memory 110' to be contiguous. An example of this first step is as follows. The contents of the video ROM from the portion of shadow memory 110' beginning at address C0000H, are copied to the portion beginning at address E0000H, as indicated by an arrow 402. After this copying has been completed, those portions of shadow memory 110' corresponding to those of original reserved memory 110 containing the video ROM and BIOS form a contiguous portion of utilized reserved memory, and the portions of shadow memory 110' containing the option ROM and video RAM form a contiguous section of free reserved memory.

If the portion of original reserved memory 110 corresponding to the option ROM is shadowed, and thus the corresponding portion of shadow memory 110' is utilized, then in a preferred embodiment, no copying of utilized reserved memory occurs. This is because the option ROM resides at the portion of shadow memory (address E0000H) that the video ROM would otherwise be copied to. However, it should be understood that any combination of free reserved memory portions could be manipulated to result in one contiguous portion of free memory in shadow memory 110'.

After the above-specified portions of shadow memory 110' have been made contiguous, the present invention then determines the highest memory location of new system memory 104. This highest distinct physical address of ne system memory is shown by 106 in FIG. 3. FIG. 3 shows an example where the additional system memory 114 is re-mapped to shadow memory 110' at addresses A0000H - DFFFFH. In this way, a typical software application which attempts to use memory locations from 0 to 256 kilobytes (Kbytes) above the highest distinct physical address of new system memory 106 actually is accessing free reserved memory.

As indicated above, in a preferred embodiment of the present invention, only contiguous portions of free reserved memory are re-mapped to. It should be understood, however, that the present invention contemplates other re-mapping schemes in which noncontiguous free shadow memory can also be re-mapped to.

A more detailed explanation of the present invention is set forth below, with respect to FIGS. 3-5. As indicated above, a preferred embodiment of the present invention contemplates that shadow memory 110' is subdivided into portions, each portion being 64 Kbytes in size. Also in a preferred embodiment, only the BIOS, option ROM, and video ROM portions of original reserved memory 110 can be shadowed. It should be understood, however, that other arrangements are possible, enabling other portions of original reserved memory 110 to be shadowed.

The decision regarding which portions of original reserved memory are to be selected for shadowing is made by a user prior to the initialization of the microcomputer. This selection information is maintained in configuration information within a non-volatile memory, so that it is retained when the main power to the microcomputer is discontinued.

When the microcomputer is initialized, the BIOS reads the information in this non-volatile memory, and detects which of the portions of original reserved memory 110 have been selected to be shadowed. A shadow bit, located in an I/O register 508 (as will be shown in FIG. 5 below), is used to determine the mode of operation, or state of the shadowing mechanism for a selected portion of the original reserved memory 110. When the microcomputer is initialized, this shadow bit is reset to 0. As stated above, the shadow bit being 0 indicates that memory is read from original reserved memory 110 and written to shadow memory 110'. Thus, any read accesses to a memory location within the reserved memory range will result in the memory within the original reserved memory 110 being read from. Conversely, an attempt to write to a memory location within the reserved memory range will result in the memory within the shadow memory 110' being written to. In a preferred embodiment, this shadow memory 110' is a form of DRAM.

Figure 5:
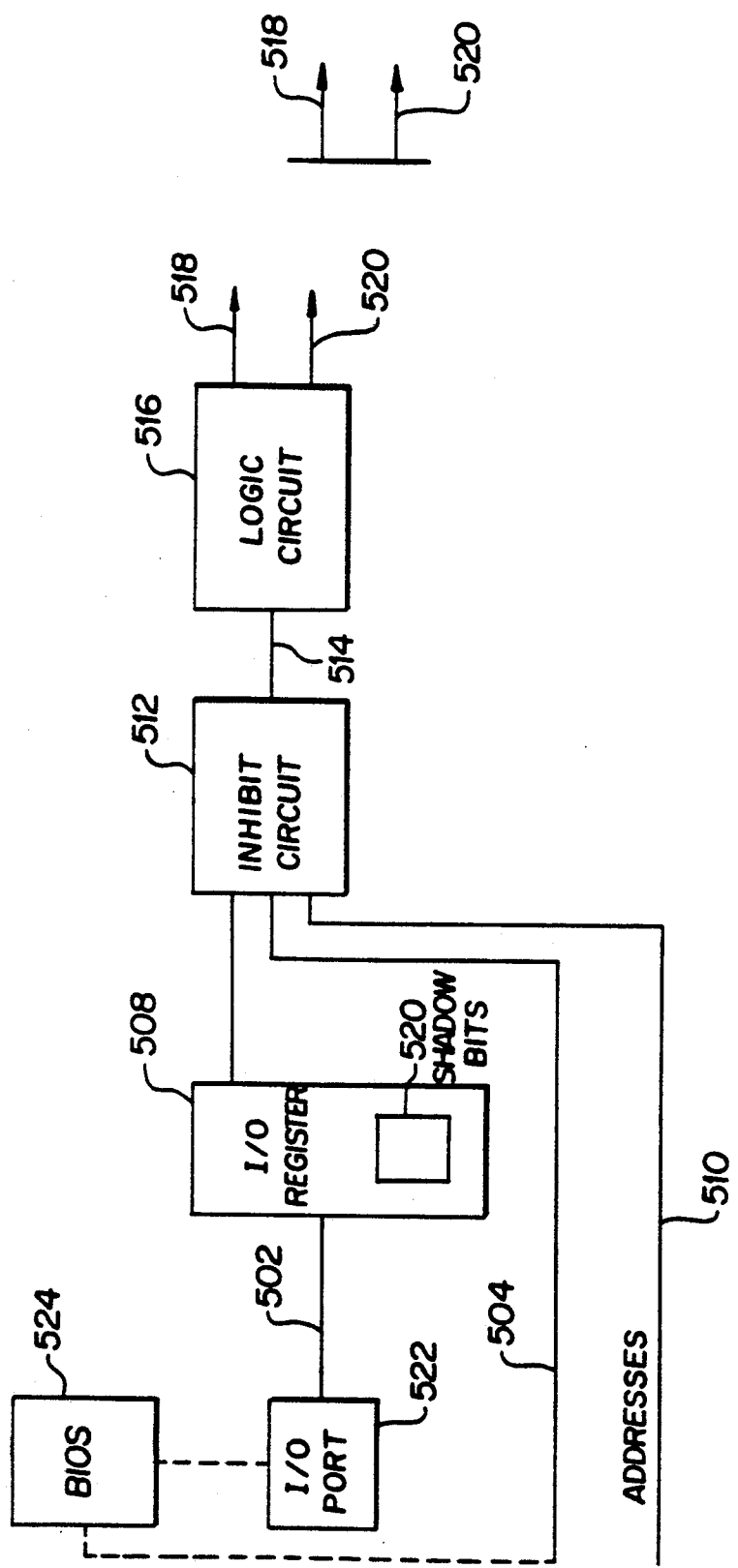
FIG. 5 is a block diagram of the circuit used in the shadowing mechanism.

Referring now to FIG. 5, once the BIOS (shown at 524) has determined which portions of original reserved memory 110 have been selected for shadowing, the shadow bits 520 in I/O register 508 are reset to 0 during initialization of the microcomputer. The BIO 524 then directs the CPU to read a double word of data at an address of a selected portion of original reserved memory 110 that is to be shadowed. An inhibit circuit 512 receives this address via address line 510. Also, the inhibit circuit receives signals via a read/write line 504 indicating whether a read or a write cycle is occurring. In a preferred embodiment, a 0 from the BIOS 524 over read/write line 504 indicates that a read cycle is occurring, and a 1 indicates that a write cycle is occurring.

On the basis of the shadow bits 520 in I/O register 508 being at 0, the inhibit circuit 512 determines that the address to be read from is that from original reserved memory 110, as opposed to shadow memory 110'. Then, the inhibit circuit 512 sends a 1 over a disable line 514 to a logic circuit 516. As a result, the logic circuit 516 sends a 1 over chip enable line 518, disabling system memory. Also, the logic circuit 516 sends a 0 over host local memory signal line 520, which enables the original system memory 102. Thus, the data which is read is read from the original reserved memory 110 on the original system memory 102.

The BIOS 524 then directs the CPU to write the double word of data back to the same address as it was read from. Inhibit circuit 512, upon receiving a 0 from the BIOS via read/write line 504 indicating that a write cycle is occurring, and noting that the shadow bits 520 in I/O register 508 are 0, sends a 0 over disable line 514 to logic circuit 516. Logic circuit then sends a 0 over chip enable line 518 to enable new system memory 104, and sends a 1 over host local memory signal line 520 to disable original system memory 102. Thus, when the BIOS 524 writes to the memory location at from which it previously read, it is actually writing to the shadow memory 110' on new system memory 104.

Then, BIOS 524 sends information to I/O register 508 via I/O port 522, specifying which portions of original reserved memory 110 have been copied to new reserved memory 110'. The shadow bits 520 within the I/O register 508 representing portions of original reserved memory 110 which have been copied to shadow memory 110' are then set equal to 1.

On subsequent read cycles, the inhibit circuit 512 will receive the address via address line 510 of the memory location to be read. The inhibit circuit 512 is only sensitive to addresses within the reserved memory range. If the bits in I/O register 508 indicate to the I/O register 508 that the address is to a portion of original reserved memory 110 which had been selected to be shadowed, the inhibit circuit sends a 0 over disable line 514 to logic circuit 516, which enables shadow memory 110' and disables original reserved memory 110 as described above. Thus, the read will occur from shadow memory 110'. If the address has not been from a selected portion of original reserved memory 110, the read will occur from the original reserved memory 110 itself.

On subsequent write cycles, if the address to be written is within the reserved memory range and if the inhibit circuit 512 notes that the address is within a portion of original reserved memory which had been selected to be shadowed, then logic circuit 516 will disable both the shadow memory 110' and the original reserved memory 110. Thus, logic circuit 516 sends a 1 over chip enable line 518, and a 1 over host local memory signal line 520. In this way, the shadow memory 110' is effectively write-protected at this point.

In a preferred embodiment, only three specified portions of original reserved memory 110 are permitted to be shadowed. Specifically, these three portions are each 64 Kbytes in size, and begin at C0000 H (video ROM), E0000H (option ROM) and F0000H (BIOS). It should be understood that the present invention contemplates the use of a shadowing mechanism which is not limited to shadowing the specific above-noted three portions of original reserved memory 110, and is also not limited to shadowing exactly three portions of original reserved memory 110. It should also be understood that the above-noted portions of original reserved memory 110 could be of any size, and are not limited to 64 Kbytes.

The above-noted shadowing technique consequently allows portions of the original reserved memory 110 to be efficiently and selectively copied to a shadow memory 110' which is typically faster than the original reserved memory 110. Since portions of the original reserved memory 110 such as the BIOS are frequently accessed, such shadowing enables the microcomputer as a whole to operate more quickly.

Figure 6:
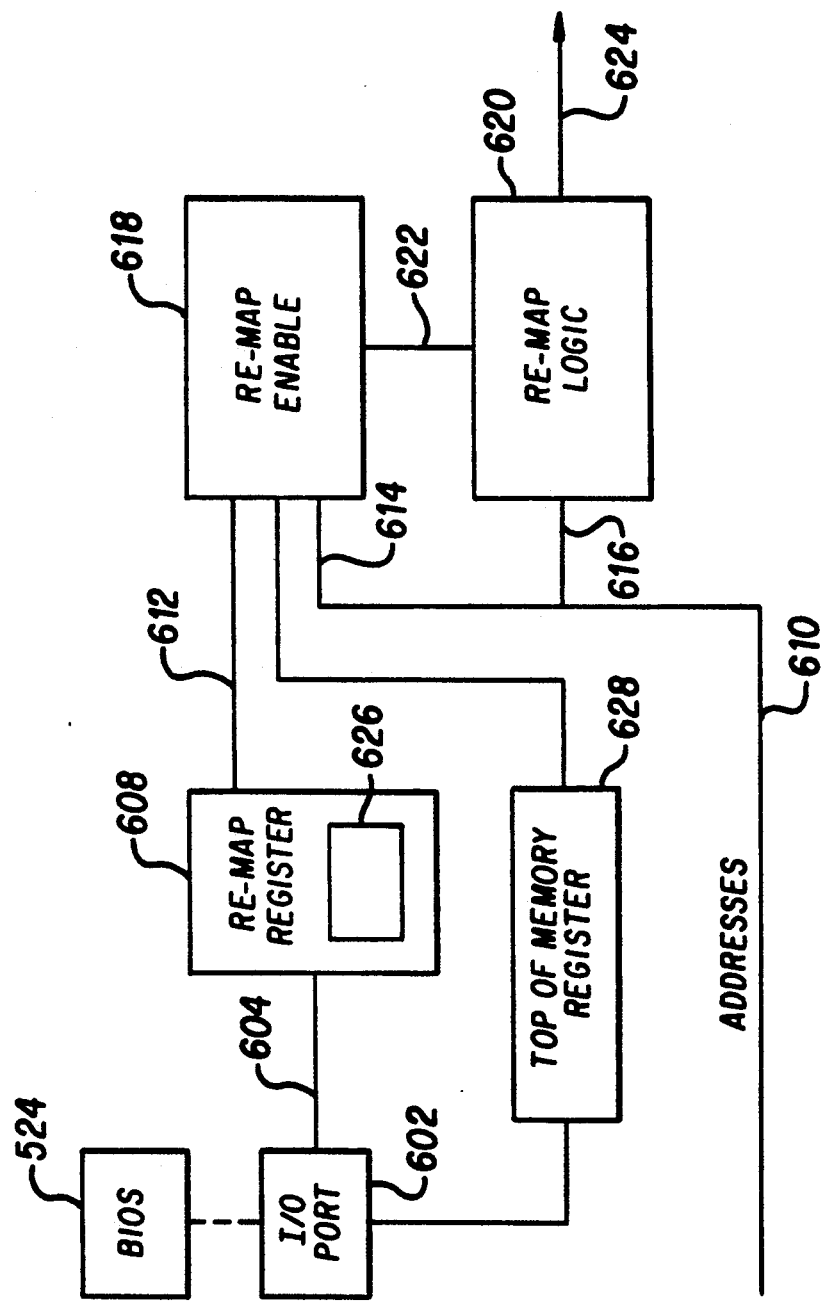
FIG. 6 is a block diagram of the circuit used in the re-mapping mechanism.

The re-mapping scheme of the present invention is now explained in more detail with regard to FIGS. 6 and 3. As stated earlier, re-mapping entails taking unused portions of the shadow memory 110 (that is, free reserved memory), and re-mapping accessible memory locations to these unused portions, so that the unused portions of shadow memory 110' are accessible to typical software applications.

In a preferred embodiment, re-mapping is automatically accomplished by the BIOS during the initialization of the microcomputer. The non-volatile memory used for designating which portions of original system memory 110 are to be shadowed is read by the BIOS, and a those portions to be re-mapped to are determined. It should be noted that those portions of shadow memory 110' which have been shadowed are not re-mapped to, since those shadowed portions of shadow memory 110' are utilized.

In a preferred embodiment, there are only two choices regarding which portions of the shadow memory 110' that can be re-mapped to. Either 128 KBytes beginning at address A0000H can be re-mapped to, or 256 Kbytes beginning at A0000H. The 256 Kbyte choice is chosen by the present invention only if the portions of shadow memory 110' are not utilized. If only those portions of shadow memory 110' corresponding to the BIOS and to Video ROM are being utilized, then the BIOS detects this, and automatically re-maps to only portions A0000H-BFFFFH. It should be understood, however, that there is no inherent constraint on which portions of shadow memory 110' can be re-mapped to, nor on the number or size of such portions.

As indicated above, the BIOS 524 reads the non-volatile memory containing information regarding which portions of original reserved memory 110 have been selected to be shadowed, and from that determines which portions of shadow memory 110' are to be re-mapped to. BIOS 524 sends this information to I/O port 602, which passes the information through line 604 to re-map register 608. In a preferred embodiment, re-map register 608 contains a total of 2 re-map bits 626, indicative of which portions of the shadow memory 110' are to be re-mapped. Depending on which of these re-map bits 626 is set, either the first 128 Kbytes beginning at A0000H of the shadow memory 110' are re-mapped to, or the first 256 KBytes beginning at A0000H are re-mapped to. If neither of these re-map bits 626 are set, then no re-mapping occurs at all. These re-map bits 626 within re-map register 608 are configured during initialization of the microcomputer.

The BIOS 524 also places in a top of memory register 628 the highest distinct physical address of new system memory 106. As indicated above, the additional system memory 114 which is accessible by typical software applications is to begin at this highest distinct physical address. Thus, the top of memory register 628 contains the starting location of additional system memory 114. The size of additional system memory 114 can be inferred from the settings of the re-map bits 626.

During normal, post-initialization operation of the microcomputer, each time a request for access to a memory location occurs, that address is sent along an address line 610. The high bits of this address are received via a high bit line 614 into a re-map enable circuit 618. The re-map enable circuit 618 examines the high bits from the address originally sent via address line 610, and accesses the information in re-map register 608 indicative of the size of additional system memory 114, and the information in top of memory register 628, which determines the location of additional system memory 114. From this information, the re-map enable circuit 618 calculates whether the address received via address line 610 is part of additional system memory 114.

If the high bits sent on high bit line 614 indicate that the address sent along address line 610 is, in fact, an address within additional system memory 114, then a signal is sent via line 622 to the re-map logic circuit 620. This re-map logic circuit 620 reads in the address sent via address line 610, and produces a re-mapped address corresponding to the appropriate address within shadow memory 110'. This new address is then sent to new system memory 104 via new address line 624. In this way, any access to additional system memory 114 is consequently re-mapped onto the corresponding free portion of shadow memory 110'.

It should be understood that present invention is not limited to its preferred embodiments, and that the examples presented above are merely for the purposes of illustration. The scope of the present invention should therefore be interpreted by the following claims as defined by the forgoing figures and text.

What is claimed is:

1. In a system for mapping one or more selected portions from a plurality of portions of an original reserved memory in a microcomputer to a portion of shadow memory, said shadow memory being a part of a new system memory having memory locations that correspond to memory locations in the original reserved memory, a computer-implemented system for re-mapping a free reserved memory portion of the shadow memory to an additional system memory, the new system memory having distinct memory addresses, where there is a highest distinct physical address the additional system memory beginning at the highest distinct physical address, the computer-implemented system for re-mapping comprising:

first means for detecting a free reserved memory portion of the shadow memory to be re-mapped to the highest distinct physical address of the new system memory, and including means for determining the size of the free reserved memory portion of the shadow memory;

second means for detecting the highest distinct physical address of the new system memory;

third means, responsive to said first and second means, for allocating a number of addresses beginning at the highest distinct physical address of the new system memory corresponding to the size of the free reserved memory portion of the shadow memory, thereby forming an additional system memory; and fourth means, responsive to said third means, for directing to the free reserved memory portion accesses to the additional system memory, wherein the microcomputer when running a program can use the free reserved memory of the shadow memory by accessing the additional system memory.

2. The system of claim 1, wherein said first means comprises means for determining which portion of the shadow memory is to be re-mapped by reading configuration information from a non-volatile memory in the microcomputer.

3. The system of claim 1, wherein said third means comprises means for recording the highest distinct physical address of the new system memory in a memory register.

4. In a system for mapping one or more selected portions form a plurality of portions of an original reserved memory in a microcomputer to a shadow memory, said shadow memory being part of a new system memory having a plurality of distinct memory addresses; a computer-implemented method for re-mapping a free reserved memory portion in the shadow memory to an additional system memory having addresses beginning at the highest distinct physical address of the new system memory, the method for re-mapping comprising the steps of:

(1) determining the portion of the shadow memory which is free reserved memory, (2) determining the size of the free reserved memory portion of the shadow memory;

(3) detecting the highest distinct physical address of the new system memory;

(4) forming additional system memory by allocating memory space beginning at the highest distinct physical address of the new system memory, the additional system memory being equal to the size of the free reserved memory portion of the shadow memory; and (5) redirecting to the free reserved memory portion, accesses directed to the additional system memory thereby allowing the microcomputer when running a program to use the free reserved memory portion of the shadow memory by accessing said additional system memory.

5. In a system for mapping one or more selected portions from a plurality of portions of an original reserved memory in a microcomputer to a portion of shadow memory having memory locations that correspond to memory locations in the original reserved memory, a computer-implemented system for re-mapping a free reserved portion of the shadow memory, the system for re-mapping comprising:

a new system memory having distinct memory addresses, wherein portions of the new system memory form the shadow memory;

an additional system memory having addresses beginning at the highest distinct physical address of said new system memory;

first means for detecting a free reserved memory portion of the shadow memory to be mapped to the additional system memory, and including means for determining the size of the free reserved memory portion of the shadow memory;

second means for detecting the highest distinct physical address of the new system memory;

third means, responsive to said second means, for allocating a number of addresses beginning at the highest distinct physical address of the new system memory corresponding to the size of the free reserved memory portion of the shadow memory, thereby forming the additional system memory; and fourth means, responsive to said third means, for directing to the free reserved memory portion accesses to the additional system memory, wherein the microcomputer when running a program can use the free reserved memory portion of the shadow memory by accessing the additional system memory.

6. The system of claim 5, further comprising means for copying all portions of the shadow memory which are storing portions of the original reserved memory to a contiguous portion of the shadow memory.

7. The system of claim 5, further comprising means for transferring portions of the free reserved memory to form one contiguous portion within the shadow memory.

* * * * *